March 17, 1970     R. G. TOWLERTON     3,500,795
NUTRITIONAL DEVICES FOR PIGLETS
Filed April 11, 1968
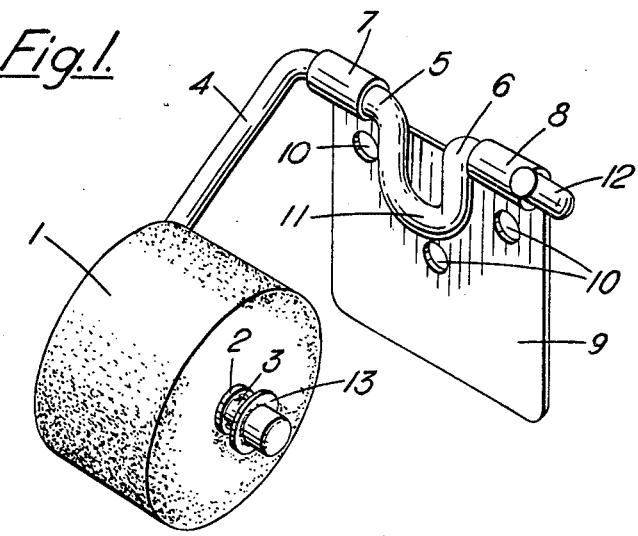
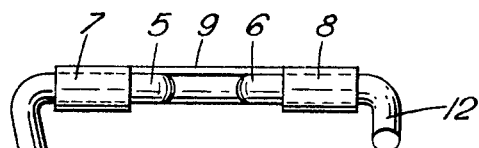
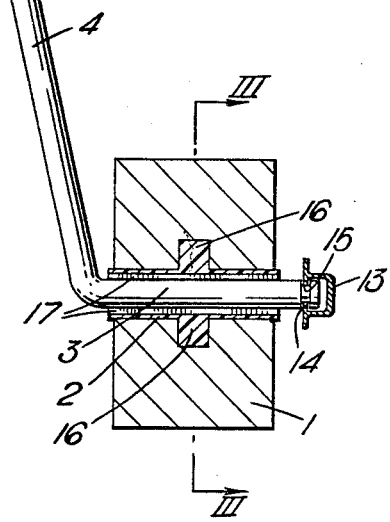
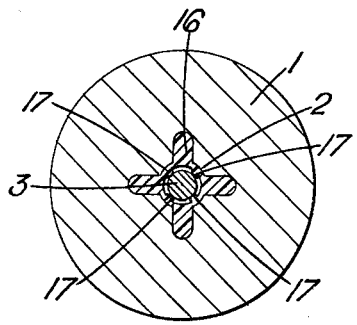
Inventor
RICHARD GEORGE TOWLERTON
By
Stephens, Huettig & O'Connell
Attorneys

United States Patent Office 3,500,795
Patented Mar. 17, 1970

3,500,795
NUTRITIONAL DEVICES FOR PIGLETS
Richard George Towlerton, Nottingham, England, assignor to Boots Pure Drug Company Limited, Nottingham, England, a British company
Filed Apr. 11, 1968, Ser. No. 720,656
Claims priority, application Great Britain, Apr. 12, 1967, 16,851/67
Int. Cl. A01k 5/00
U.S. Cl. 119—51                                         8 Claims

ABSTRACT OF THE DISCLOSURE

A device for administering assimilable iron to piglets comprises an iron lick block rotatably mounted on an axle. This axle is attached to an arm which is pivotally connected to a support.

---

The present invention relates to solid nutritional supplements for animals. More particularly, the invention concerns a device for administering nutritional supplement licks containing assimilable iron to piglets, for the prevention of iron-deficiency anaemia.

Solid feed supplements for animals are often provided in the form of blocks composed of edible material that is palatable to the animal concerned and that contains one or more substances beneficial to the growth and/or health of the animal, e.g. vitamins, minerals, and growth stimulants. These blocks are termed licks and are placed where animals can lick and/or gnaw them and thereby ingest the constituents of the lick.

In piglet rearing, iron-deficiency anaemia is a serious problem during the early part of the piglets' lives prior to weaning, and in order to inhibit the development of anaemia an assimilable form of iron is generally administered to the piglets, generally by oral administration of tablets, pills or pastes or by subcutaneous or intramuscular injection. However these methods are known to possess disadvantages. For example, the methods involve individual handling of the piglets which causes stress to the piglets and is also labour-consuming, especially in the case of the oral administration of tablets, pills, or pastes where repeated dosing of each piglet by hand is necessary. Injecton also involve the risk of infection at the injection site especially when, as is often the case, the injections are carried out by farm workers. In addition, injections may cause permanent discolouration at the injection site which adversely affects the quality of the ham.

Assimilable iron for piglets can be made into a lick and it would be highly desirable if the piglets could be relied upon to lick or gnaw such a lick sufficiently to ingest the iron they need, since this method of adminstration avoids the disadvantages of individual handling and the risks of injection.

Conventional methods of mounting licks have been found to be not entirely satisfactory as very young piglets show insufficient interest in the licks. It is one object of the present invention to provide a device that encourages very young piglets to consume licks containing assimilable iron.

According to one aspect of the present invention there is provided a device for administering assimilable iron to piglets which comprises an iron lick block of material palatable to piglets and containing assimilable iron rotatably mounted with limited axial movement on a substantially rigid axle attached to an arm pivotally connected to a support.

The arm and the axle may be integral with one another. The device should preferably be so constructed as to permit the axle, and thus the block, to swing up and down through a vertical arc while the axle remains substantially horizontal, i.e. the axle should preferably pivot about an axis substantially parallel to the axle.

It will be appreciated that the axle may be attached to a single arm, or to two or more arms which are pivotally connected to a support. For practical purposes, it is generally convenient for the axle to be attached to one or two arms.

The arm or arms may each terminate in an end portion by means of which the arm or arms may be pivotally connected to a support. For example the end portion may comprise a pivot or socket by means of which the arm or arms may be pivotally connected to a support, for example the wall of a pig pen, by means of co-operating sockets or pivots on the support. Thus part at least of the end portion preferably extends substantially parallel to the axle; the end part may extend rectilinearly or it may be curved. A socket on the support may comprise one or more brackets which may be arranged horizontally. The axle generally forms an angle with the arm or arms and it is often convenient for this angle to be approximately a right angle, for example 85–110°, or to be substantially a right angle.

Preferably the support comprises a plate to which the arm or arms may be attached. The plate may then be fixed to a wall, for example the wall of a pig pen.

The axle and arm or arms may be fabricated from a single piece of material or from several pieces. The axle may pass right through the block, or may comprise two stub axles, passing only partially through the block. It is often adequate that the block should merely have a hole through its axis to permit the axle to pass through it, but the block may be advantageously firmly attached to a hollow axial spindle. The spindle may extend beyond each end of the block. The shape of the block is preferably such that the block may be mounted on an axis of symmetry, which is the preferred way of mounting the block. The block is preferably cylindrical, and is preferably mounted on its longitudinal axis.

The iron lick block is suitably composed of material which comprises assimilable iron and a flavouring agent, preferably a sweetening agent. Suitable sweeting agents include (1) sugars, for example, sucrose, glucose, molasses, lactose and fructose and (2) synthetic sweetening agents, for example saccharin. The sweetening agent preferably comprises a sugar. A sugar may also act as a binding agent in the formation of the block. By the term "assimilable iron" is meant a source of metabolizable iron orally acceptable to piglets, for example reduced iron or iron salt orally acceptable to piglets such as ferrous fumarate. The block is suitably composed of material comprising 50–95% w./w., preferably 60–95% w./w., of an iron salt orally acceptable to piglets and 5–40% w./w., preferably 5–25% w./w., of sweetening agent which preferably comprises sucrose. The blocks may be prepared by conventional techniques, for example compression moulding and cast moulding.

It will be appreciated that, in use, the block will need to be renewed from time to time. In order to meet this need, the arm or arms may be releasably attached to the plate, the axle may be releasably attached to the arm or arms, or the block may be releasably mounted on the axle.

In use, when the device of the present invention is in its rest position, i.e. the block is not being licked and pushed upwards by piglets, the block may rest against a wall, plate or other support.

The aforementioned hollow axial spindle preferably has an interior surface that carries friction means which resists the rotation of the spindle on the axle in such a way that the block cannot rotate freely but can be readily rotated by piglets. This arrangement is advantageous since it promotes consumption of the block by the piglets in a symmetrical manner. A freely rotating block made asymmetric by piglets will tend to stay in one position and so promote further asymmetric consumption. The friction means suitably comprises a plurality of ridges which bear on the axle. The ridges may be longitudinal or circumferential. The hollow axial spindle may be moulded from a plastics material such as polyethylene, polypropylene, polyvinyl chloride or polyacetal, and the ridges may be formed during the moulding process.

Devices according to the invention are advantageous since we have surprisingly found that they encourage piglets, even those aged below 2 weeks, to lick and gnaw at the rotatably mounted block. We have found that piglets appear to play with the block, moving it up and down with their mouths and at the same time licking it and gnawing at it. Piglets above the age of 2 weeks will readily lick and gnaw at a palatable block which has a sweet taste. However younger piglets possess this tendency to a markedly less extent. Accordingly the above described mouthing arrangement which encourges the piglets to lick and gnaw at the block is particularly valuable during the first 2 weeks of the lives of piglets, which is a time during which they are very susceptible to anaemia and its effects.

In use, the device of the present invention is fastened in a position where the suckling piglets, but not their sow, can reach the block. Such a position is often situated in the railed-off area of a pig pen known as the "creep" area. Thus according to a further feature of the invention there is provided a method for preventing iron-deficiency anaemia in suckling piglets which comprises allowing the piglets, but not their sow, access to a device as hereinbefore described.

An example of a preferred form of device acoording to the invention will now be described with reference to the accompanying drawings.

FIGURE 1 is a perspective view of the device; FIGURE 2 is a plan view of the device shown in FIGURE 1, with the block being shown in section; FIGURE 3 is a section on the lines III—III in FIGURE 2. The device comprises a cylindrical block 1 moulded around a hollow axial spindle 2 which is mounted on an axle 3. The axle 3 is attached at an angle to an arm 4 connected at an angle to cylindrical pivots 5 and 6 which are free to rotate in cylindrical sockets 7 and 8. The sockets 7 and 8 are attached to the top of a rectangular plate 9 shown in a vertical position in the drawing. The plate is perforated by three circular holes 10 by which the plate may be screwed to a wall. The pivots 5 and 6 are joined to a pivot extension 11 which abuts against the plate when the device is in its rest position as shown in the drawing, thus holding the block away from the plate. The pivot 6 is connected to a pivot extension 12. When the plate 9 is fixed to a wall, the pivot extension 12 abuts against the wall when the block is raised by piglets, preventing the block from rising too far, and thus ensuring that the block readily returns to its rest position when not being pushed upwards by piglets. A releasable locking device 13 fits securely on to the end of the axle 3 to prevent the block slipping off the axle.

The axle 3, arm 4, pivots 5 and 6 and pivot extensions 11 and 12 are formed from one piece of metal rod, suitably of mild steel, of circular cross-section. The plate 9 and attached sockets 7 and 8 are formed from metal sheet, suitably of mild steel. The axial spindle 2 is suitably moulded from plastics material.

As shown in FIGURE 2 and rim 14 of the locking device fits into a groove 15 on the axle, ensuring a secure fit.

The axle 3 is substantially parallel to the pivots 5 and 6. The cross-section shows two radial spigots 16 which are part of the spindle, and around which the block is moulded, thus supporting the block on the spindle. There are four such radial spigots on the spindle, as shown in FIGURE 3. The interior surface of the spindle carries four longitudinal ridges 17 which bear on the axle 3 and resist the rotation of the spindle around the axle.

The following non-limitative example illustrates the invention.

EXAMPLE 1

Cylindrical iron licks were prepared from the following ingredients

| | Kg. |
|---|---|
| Ferrous fumarate (powder) | 33.6 |
| Sucrose powder (icing sugar) | 4.0 |
| Molasses (syrup) | 22.0 |
| Gum acacia | 0.4 |
| Gum tragacanth | 0.04 |
| Water | 1.6 |

The ingredients, apart from the molasses, were thoroughly mixed. To the stirred mixture was slowly added the molasses dissolved in 800 ml. of water, followed by the rest of the water. The damp mixture was immediately compressed in cylindrical moulds of diameter 5.2 cm. using 100 g. damp mixture per mould, at a pressure of about 3–4 Kg./cm.$^2$ to a thickness of 3.1 cm.

The damp mixture was compressed in each mould around a hollow axial spindle moulded from polypropylene. Each spindle was 3.5 cm. long, with an external diameter of 9 mm. and a smooth bore of diameter 0.46 cm. Each spindle had 4 symmetrical radial spigots extending 0.5 cm. from the outer circumference of the spindle, half way along its length. The resulting blocks were then dried in an oven at 60° C. to give 360 cylindrical blocks (blocks A) of weight 94–95 g. and dimensions length 2.8–3.0 cm., diameter 5.2–5.3 cm., mounted on axial spindles.

Some of these blocks were momentarily dipped into a solution of molasses (syrup) and glycerol in water, the solution containing 10% w./w. molasses and 15% w./w. glycerol. After dipping, the blocks were dried for 1 hour at 60° C., to give blocks with a cohesive, soft outer layer of depth 0.2–0.3 cm. (blocks B).

In comparative trials, blocks A and blocks B were pivotally mounted in pig pens by means of the device shown in FIGURES 1–3, except that the interior surface of the axial spindle was smooth and freely rotatable on an axle of diameter 0.44 cm. The axle was attached to an arm 7.5 cm. long pivotally connected to a plate fixed to a wall in the creep area of the pig pen so that the block, rotatably mounted on a horizontal axle, pivoted about a horizontal axis 14 cm. from the floor of the pen. Litters of suckling piglets with access to their sows were reared on blocks A or B using 1 block per litter, provided when the piglets were 1 day old. Control piglets were also reared without any blocks.

Blocks B proved to be much more attractive to very young piglets than the undipped blocks A. The piglets started to lick and gnaw at blocks B appreciably at age 2–3 days and appreciable quantities of the blocks were consumed between this age and age 6 days, and thereafter. The piglets did not start to lick and gnaw at blocks A appreciably until they were 6 days old.

Blood haemoglobin levels of the piglets were determined at ages 10 and 21 days, with the following results.

(Hb percent denotes the mean blood haemoglobin levels in g./100 ml. These mean values are given ± the standard error.

| Block | None (control) | A (undipped) | B (dipped) |
|---|---|---|---|
| Hb percent at 10 days | 7.1±0.22 | 8.6±0.152 | 9.7±0.135 |
| No. of piglets | 50 | 115 | 90 |
| Hb percent at 21 days | 6.2±0.23 | 10.9±0.225 | 10.7±0.086 |
| No. of piglets | 50 | 114 | 435 |

This result is significantly higher than the mean for the undipped blocks A ($p<0.001$).

The results show that the control piglets were on the borderline of anaemia at 10 days and anaemic by 21 days. The haemoglobin levels of the piglets reared on blocks A were good at 10 days and excellent at 21 days. The haemoglobin levels of the piglets reared on blocks B were excellent at both 10 and 21 days. Both blocks were effective in maintaining the blood haemoglobin levels of piglets well above the borderline value of 7 g./100 ml. during the critical first 3 weeks of their lives.

It was observed that piglets aged below 2 weeks paid more attention to blocks A and B when pivotally mounted as described above than to the blocks when simply screwed to the wall of the pig pen by means of a screw passing through an axial hole in the blocks, whether the blocks could rotate on the screw or not. It was surprisingly found that the encouragement to consume the blocks provided by the pivotal mounting was most marked in the case of the less active piglets in a litter. Thus the pivotal mounting advantageously promotes a more uniform consumption of the blocks throughout the piglets in a litter.

We claim:

1. A device for administering assimilable iron to piglets which comprises an consumable iron lick block of material palatable to piglets and containing assimilable iron rotatable mounted with limited axial movement on a substantially rigid axle attached to an arm pivotally connected to a support, said axle being spaced from and rotating about the pivoted support.

2. A device according to claim 1 in which the support comprises a plate.

3. A device according to claim 2 in which the device includes stop means to hold the block away from the plate.

4. A device according to claim 3 in which the block is attached to a hollow axial spindle.

5. A device according to claim 4 in which the spindle has an interior surface that carries friction means which resists the rotation of the spindle on the axle.

6. A device according to claim 5 in which the friction means comprises a plurality of ridges which bear on the axle.

7. A device according to claim 1 in which the block is cylindrical.

8. An article for use in the device according to claim 1 which comprises an iron lick block of material palatable to piglets and containing assimilable iron rotatably mounted with limited axial movement on a substantially rigid axle attached to an arm having an end portion of which part at least extends substantially parallel to the axle.

References Cited

UNITED STATES PATENTS

| | | | |
|---|---|---|---|
| 1,009,361 | 11/1911 | Weil | 119—51 |
| 1,369,079 | 2/1921 | Boothe | 119—51 |
| 1,596,333 | 8/1926 | Boyle | 119—51 |
| 2,908,250 | 10/1959 | Ansier | 119—51 |

ALDRICH F. MEDBERY, Primary Examiner

U.S. Cl. X.R.

99—2